United States Patent [19]

Möring et al.

[11] Patent Number: 4,689,664
[45] Date of Patent: Aug. 25, 1987

[54] CIRCUIT ARRANGEMENT FOR DERIVING DIGITAL COLOR SIGNALS FROM AN ANALOG TELEVISION SIGNAL

[75] Inventors: Wilhelm Möring, Hamburg, Fed. Rep. of Germany; Antonius H. H. J. Nillesen, Eindhoven, Netherlands; Jürgen Ruprecht, Hamburg-Oststeinbek, Fed. Rep. of Germany

[73] Assignee: U.S. Philips Corporation, New York, N.Y.

[21] Appl. No.: 772,078

[22] Filed: Sep. 3, 1985

[30] Foreign Application Priority Data

Sep. 3, 1984 [DE] Fed. Rep. of Germany ....... 3432314

[51] Int. Cl.⁴ .............................................. H04N 9/66
[52] U.S. Cl. ....................................... 358/23; 358/13
[58] Field of Search ..................... 358/13, 21 R, 23, 28

[56] References Cited

U.S. PATENT DOCUMENTS

| 4,349,833 | 9/1982 | Clarke ................................. 358/13 |
| 4,503,453 | 3/1985 | Rougeolle et al. ................... 358/13 |
| 4,558,348 | 12/1985 | Bolger et al. ....................... 358/13 |

Primary Examiner—John W. Shepperd
Attorney, Agent, or Firm—Thomas A. Briody; William J. Streeter; Gregory P. Gadson

[57] ABSTRACT

In a circuit arrangement for deriving digital color signals from an analog television signal by means of an A/D converter, which forms a digital television signal from the analog television signal in synchronism with a clock signal which corresponds to a whole multiple of the line frequency of the television signal, and further by means of a demodulator, a first phase detector, a first phase calculator and a signal generator, which are interconnected in a phase-locked loop, interference-free demodulation of the chrominance signal in the composite television signal is guaranteed, even when the frequency of the clock signal fluctuates, in that the first phase calculator is supplied not only with a color phase signal from the first phase detector but also with a reference phase signal from a reference circuit which is a measure of the frequency difference or phase difference between the clock signal and a reference signal of stable frequency.

12 Claims, 9 Drawing Figures

CIRCUIT ARRANGEMENT FOR DERIVING DIGITAL COLOR SIGNALS FROM AN ANALOG TELEVISION SIGNAL

BACKGROUND OF THE INVENTION

The invention relates to a circuit arrangement for deriving digital color signals from an analog television signal with an analog/digital converter, which forms from the analog television signal a digital television signal, which comprises a sequence of discrete-amplitude samples of the analog television signal with a repetition frequency determined by a clock signal that corresponds to a whole multiple of the line frequency of the television signal, a demodulator which forms the digital color signals by multiplication of the digital television signal by at least a digital demodulation signal, a first phase detector which derives from certain digital color signals a color signal which is a measure of the phase positions of the digital color signals relative to the demodulation signals, a first phase calculator which delivers a first control signal that consists of a sequence of values with a repetition frequency determined by the clock signal and whereby the difference between every two consecutive values is adjusted by the color phase signal, and a signal generator which forms from the control signal the demodulation signal or signals, and a reference circuit which comprises a reference signal source, a phase detector that generates a reference phase signal, and a second phase calculator that delivers a second control signal consisting of a sequence of signal values, whereby the difference between every two consecutive signal values is adjusted by the reference phase signal, and which supplies the reference phase signal to the first phase calculator for supplementary adjustment of the difference between two consecutive values of the first control signal.

A circuit arrangement of this type is known from European Patent Application No. 111 981. The circuit arrangement therein described comprises a phase calculator which is supplied with a clock signal whose frequency corresponds to a whole multiple of the line frequency of the television signal and which delivers a control signal. This control signal consists of a sequence of values of discrete amplitude whose repetition frequency corresponds to the frequency of the clock signal. The values of the control signal address in a read-only memory (signal generator) samples or a sinusoidal and a cosinusoidal signal which are respectively delivered at an output with a repetition frequency corresponding to the frequency of the clock signal. The frequency of the sinusoidal and of the cosinusoidal signal is thereby equal to the frequency of the color synchronization signal in the television signal. The analog television sigal is sampled in an analog/digital converter with the frequency of the clock signal and thereby converted into a pulsed sequence of discrete-amplitude digital samples. This digital television signal is multiplied in two multipliers by the sinusoidal and by the cosinusoidal signal, respectively, from the read-only memory. The digital color difference signals thereby formed are fed to a phase detector which generates a color phase signal. This is fed to the phase calculator for correcting the difference between two consecutive values of the control signal sent to the signal generator.

Fixing the clock frequency at a whole multiple of the line frequency of the television signal instead of fixing it at a whole multiple of the frequency of the color synchronization signal has the advantage that the time sequence of the samples of the television signal is directly adapted to its line, field and frame structure. This considerably simplifies the use of digital picture memories and improves the resultant picture quality. It also simplifies the processing of television signals of different standards.

A phase calculator in accordance with the prior art comprises in the simplest case a modulo adder with two inputs and one output, which is connected to an input of a register whose output is looped back to one of the inputs of the modulo adder. Via the second input a digital signal is supplied to the modulo adder whose value is also described as an increment. The modulo adder is further supplied with a clock signal. In each period of this clock signal the values of the signals applied to the inputs of the modulo adder are added together and the resultant sum signal is fed via the output of the modulo adder to the register, where it is stored. The value stored in the register during a period of the clock signal is fed to the first input of the modulo adder, and in the next period of the clock signal it is linked with the increment to form a new sum signal.

Such a phase calculator thus essentially constitutes an accumulator arrangement, which accumulates the increment with the frequency of the clock signal. The increment thereby forms the difference between two consecutive values of the sum signal and thus of the signal delivered at the output of the register. During accumulation the sum signal is thus increased in steps from an initial value with the frequency of the clock signal until a certain value is exceeded, at which point the accumulation begins again starting with the residual value. The sequence of the values of the signal delivered from the phase locked loop at the output of the register thus forms a discrete-time periodic signal with a frequency that depends on the frequency of the clock signal and on the increment. It is thus on the one hand possible to adjust with the increment the frequency of the signal delivered from the phase calculator, but on the other hand flucuations in the frequency of the clock signal, which may be caused in particular by variations in the line frequency of the television signal, can become troublesome. Such fluctuations typically occur in television signals obtained from video recorders and similar apparatus. Via the sinusoidal and cosinusoidal signals used respectively for demodulating the television signal to obtain the chrominance signal, fluctuations occur in the color difference signals that give rise to troublesome color interference in the television picture. It appears that the television picture is much more sensitive to color distortions caused by a deviation in the frequency of the clock signal than to a deviation of the line frequency corresponding to this deviation in the frequency of the clock signal.

In the known circuit arrangement a reference circuit has therefore been added that generates a reference phase signal which is fed to the first phase calculator in order to compensate for clock signal frequency fluctuations caused by line frequency fluctuations. With the aid of the second phase calculator the reference circuit generates in addition the clock signal having the line frequency. The reference phase signal serves as an increment of the second phase calculator, which accumulates the increment with the frequency of a reference clock signal generated by the reference signal source. In a converter which follows the second phase calculator and which forms a sawtooth signal from a squarewave signal, the said converter comprising at least a D/A converter, the clock signal is formed which is also fed via a frequency divider to the second phase detector. The second phase detector, which is also supplied with line sync pulses, generates therefrom the reference phase signal. Since the frequency of the reference signal source is much higher than the clock signal frequency, fast and therefore costly digital building blocks and also fast D/A converter are required for the stages operating at the frequency of the reference clock signal.

SUMMARY OF THE INVENTION

The object of the invention is to provide a circuit arrangement of the kind mentioned in the preamble, with little outlay, will ensure interference-free demodulation of the chrominance signal in the television signal when fluctuations occur in the frequency of the clock signal.

This object is achieved with a circuit arrangement of the kind mentioned in the preamble in that the sequence of values of the second control signal from the second phase calculator consists of a sequence whose frequency is determined by the clock signal and in that the second phase detector compares the second control signal with the reference signal generated by the reference signal source and forms therefrom the reference phase signal.

The reference phase signal, which together with the colour phase signal is fed to as increment to the first phase calculator, is also fed as an increment to the second phase calculator, resulting in a total arrangement consisting of two coupled phase-locked loops. The phase-locked loop formed by the second phase calculator, the reference signal source and the second phase detector corrects very rapidly for phase shifts of the first control signal caused by clock signal fluctuations by means of changing the reference phase signal, which also very rapidly compensates for influences of the fluctuating clock signal on the first phase calculator, without its being necessary that the phase-locked loop to which the first phase calculator belongs should have a correspondingly high control speed. The indicated arrangement of two coupled digital phase-locked loops is thus stabilised against fluctuations of the clock frequency. This stabilisation is determined by the stability of the reference signal frequency, to which end the reference signal source should preferably comprise a quartz oscillator from whose oscillations the reference signal is derived. The whole circuit arrangement is thus governed by a clock signal generator and the reference circuit consists of digital building elements that are easy to implement.

In principle, the frequency of the clock signal in a circuit arrangement in accordance with the invention may be a rational (broken) multiple of the line frequency of the television signal, but is should preferably be a whole multiple.

In a further embodiment of the invention the reference phase signal is additively superimposed on the color phase signal before being fed to the first phase calculator. This super-position takes place in particular in an adder placed before the first phase calculator and separated from it, so that the first phase calculator is supplied only with a signal for adjusting the difference of two successive values of the first control signal.

In a further embodiment of the invention, in which the clock signal is derived in a phase-locked loop from a clock oscillator whose oscillation frequency is determined by a frequency-control signal obtained from a comparison of a line synchronization signal contained in the analog television signal with the frequency-divided clock signal, the frequency control signal is additively superimposed on the reference phase signal fed to at least the first phase calculator. This is because the frequency control signal already contains information on the fluctuations of the line signal and hence on the impending fluctuations in the frequency of the clock signal, before it reaches the second phase detector and is removed by the second phase calculator. This information on the fluctuations in the frequency of the clock signal is now, in accordance with the indicated further embodiment of the invention, fed to the first and the second phase calculators as an increment in the sense of a rough adjustment of the fluctuations occurring in the frequency of the clock signal, which is done by additive superimposition with the reference phase signal. This coarse adjustment is then followed by the indicated fine adjustment by means of the coupled phase-locked loops.

In yet another embodiment of the invention the reference phase signal is fed to the first and to the second phase calculator via a reference phase signal controller. The addition of such a reference phase signal controller to the phase-locked loop makes it possible to influence the control behavior of the loop, for example its control speed, in the desired manner. In the present case a reference phase signal controller with a high control speed is preferably chosen.

In another embodiment of the invention the reference phase signal controller comprises a proportional-integral control stage, referred to briefly as a PI controller. Such a PI controller allows both fast and accurate control.

In yet another embodiment of the invention the reference phase controller comprises a chain circuit of at least two integrators of which at least one proportional branch is connected in parallel. The arrangement of a second phase calculator, a second phase detector and a reference phase signal controller then constitutes a phase-locked loop of at least the third degree. A reference phase signal controller of this kind reduces the control error of the phase-locked loop during certain changes in the frequency of the clock signal, in particular during time-linear changes. Especially when the reference phase signal controller is implemented only with one PI controller and when continuous, ramp-shape changes take place in the frequency of the clock signal, a constant control error may arise as a result of which an erroneous increment is fed to the first phase calculator during this ramp-shape change. Such control errors are avoided, however, with a phase-locked loop of the third degree.

In a further embodiment of the invention the reference phase signal is fed to an input of a distortion stage the output signal of which is fed to the reference phase signal controller, and the distortion stage so distorts the reference phase signal that large values of the reference phase signal are enlarged more than proportionally compared with small values in accordance with a non-linear arrangement between values at the input and the output. Upon slight deviations between the frequency and/or phase of the reference signal and the second control signal the phase control circuit then shows a slight loop again, that is to say small deviations lead to only a small value for the reference phase signal. The phase control circuit then also shows only a small control speed and a small bandwidth, thus entailing good noise suppression during accurate and slow removal of small control errors. Due to the more than proportional increase of the reference phase signal at the output of the distortion stage compared with the signal at its input upon relatively large deviations in the frequencies and-/or phases of the reference signal and of the second control signal, however, the phase-locked loop achieves a high loop gain and hence a high control speed in the event of relatively large disturbances. In this way it is able to correct quickly for large phase and/or frequency deviations. The larger bandwidth and hence poorer noise suppression which this entails in the phase-locked loop does not have any disadvantageous effects, since upon their occurrence the loop is not yet locked.

In a further embodiment of the invention the distortion stage contains a storage device which for every value of the reference phase signal forms a value at the output of this stage and which is fed to the reference phase signal controller. A storage device of this nature can be in the form of a read-only memory, whose individual memory locations are addressed by the values of the signal at the input of the distortion stage and which thereupon feeds to the output of the distortion stage the values stored in the addressed memory locations. In this way any desired arrangements can be obtained between the values at the input and the values at the output of the distortion stage. If necessary several storage arrangements with different configurations can be selected and for example selectively introduced into the phase-locked loop by means of switching devices.

In a further embodiment of the invention the distortion stage contains a quantizer which compares the values of the reference phase signal with one or more threshold values, and a selector circuit driven by the quantizer which converts values of the reference signal applied to its input individual ranges of values limited by the threshold value or values in accordance with a linear arrangement, which values are fed from the output of the distortion stage to the reference phase signal controller. With such an arrangement a linear allocation of the values at the input and output of the distortion stage is obtained. It is then possible to adjust a small control loop gain for small phase or frequency deviations and a larger loop gain for large phase or frequency deviations. Compared with an addressable memory configuration, this permits a reduced outlay on circuitry, especially when the number of threshold values is small.

In a further embodiment of the invention the reference signal source delivers a square-wave signal which is sampled by means of a register controlled by a clock signal. This register is advantageously implemented as a 1 bit register, which stores both signal values of the square-wave signal.

In another embodiment of the invention the reference signal source comprises an oscillator which delivers a signal having a frequency that corresponds to a whole multiple of the frequency of the reference signal, and a converter which converts the oscillator signal into a periodic signal of discrete amplitude and having the frequency of the reference signal. Such a converter may for example be implemented as a counter or as an analog/digital converter. Values of the second control signal and of the reference signal, with a repetition frequency corresponding to the frequency of the clock signal, are then fed to the second phase detector. If in particular the frequency of the oscillator signal is substantially higher than that of the reference signal, the converter performs accurate quantisation of the reference signal, which makes an exact phase comparison possible in the second phase detector. In the phase-locked loop in which the second phase detector is circuited only slight quantisation noise occurs, caused by the discrete-amplitude reference signal. The phase-locked loop can then, as described above, have a large bandwidth i.e. a high control speed, without giving rise to substantial noise in the circuit.

In a further embodiment of the invention the frequency of the reference signal is at least almost equal to the frequency of the colour synchronization signal of the television signal. Such a choice of the reference signal frequency is advantageous since the first control signal delivered by the first phase calculator has the frequency of the colour synchronization signal. If the frequency of the reference signal corresponds at least approximately to the colour synchronization signal, the circuit arrangement as a whole can be particularly simple.

BRIEF DESCRIPTION OF THE DRAWINGS

Some examples of embodiments of the invention are shown in the drawings and are described in more detail in the following.

DETAILED DESCRIPTION OF THE INVENTION

Figure 1:
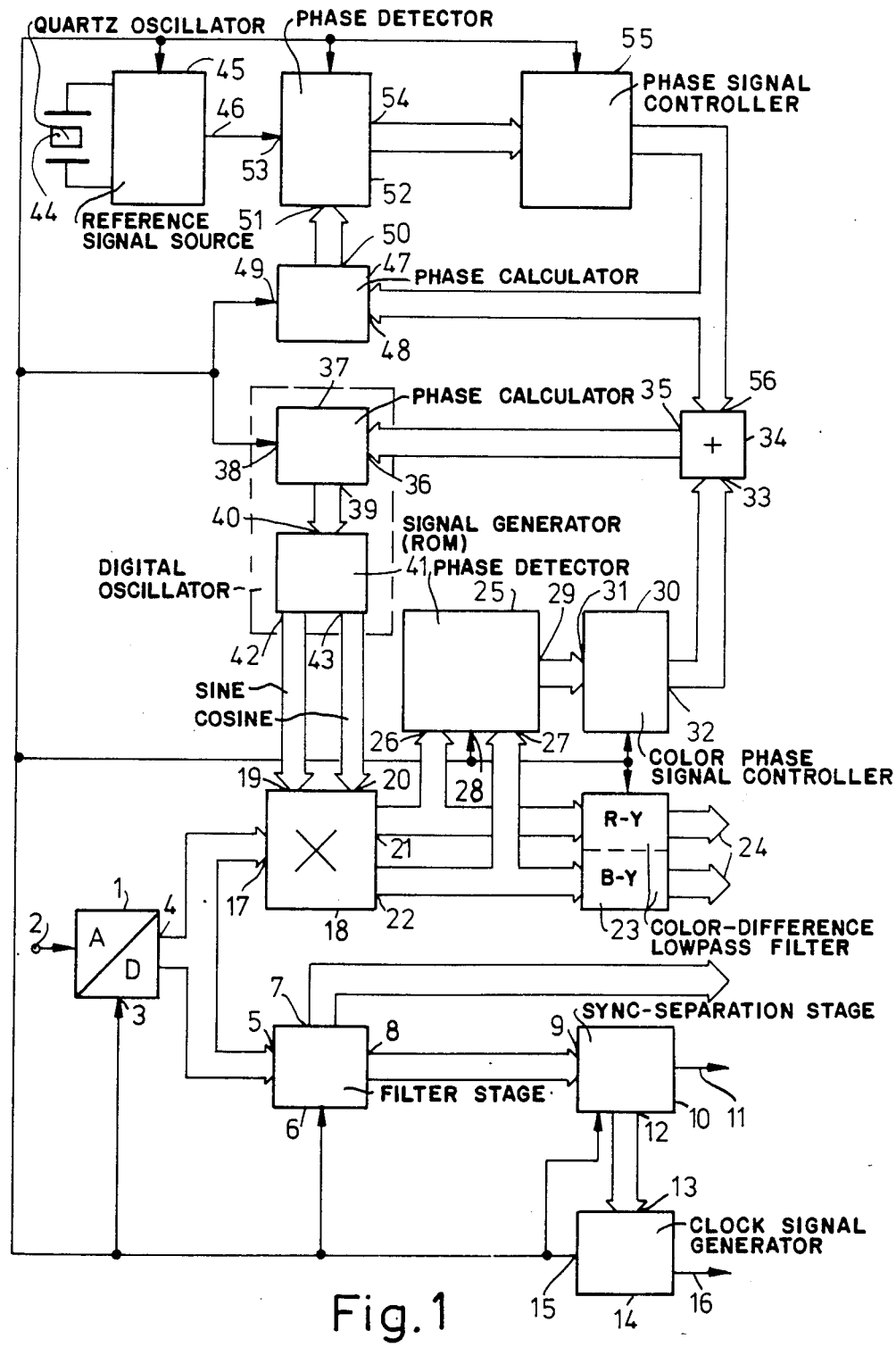
FIG. 1 shows a block diagram of an embodiment by way of example.

In the circuit arrangement in FIG. 1 the numeral 1 denotes an analog/digital converter to an input 2 of which an analog television signal is fed, which comprises an analog luminance signal, an analog chrominance signal together with vertical and horizontal synchronization pulses. A periodic clock signal is fed to a clock input 3 of the analog/digital converter 1. In each period of this clock signal a discrete-amplitude sample is derived in the analog/digital converter 1 from the analog television signal at the input 2, which is preferably delivered in parallel form at an output 4.

The digital television signal is fed to an input 5 of a filter stage 6, which derives therefrom in a first step a digital luminance signal by suppression of the chrominance signal and delivers it to a luminance signal output 7, and in a second step obtains by lowpass filtering a signal which essentially contains both the syncrhonization pulses and the low-frequency component of the luminance signal and which is delivered to a synchronization pulse output 8. From this point this signal reaches an input 9 of a sync-separation stage 10, which separates therefrom the vertical synchronization pulses and delivers them to a vertical synchronization output 11. The horizontal synchronisation pulses are fed from the sync separation stage 10 via a horizontal sync output 12 to a sync input 13 of a clock signal generator 14. The clock signal generator 14 delivers to a clock signal output 15 the clock signal which is fed to the clock input 3 of the analog/digital converter 1. The clock signal generator 14 delivers to a line sync output 16 line sync pulses which are derived from the horizontal sync pulses.

The clock signal generated by the clock signal generator 14 is synchronization by the horizontal sync pulses fed to the synchronization input 13 and has a frequency which corresponds to a whole multiple of the repetition frequency of the horizontal sync pulses. The frequency of the clock signal is therefore connected with the repetition frequency of the horizontal sync pulses and varies with the variations of this repetition frequency, so that for example frequency deviations in this repetition frequency or deviations in the phase position of individual horizontal sync pulses, as occur especially in an analog television signal obtained from a picture recording device, more particularly from a video recorder, result in changes in the frequency of the clock signal.

The digital television signal from the output 4 of the analog/digital converter 1 is further fed to a television signal input 17 of a demodulator 18, a first and a second demodulation signal being fed to a first and to a second demodulation signal input 19 and 20, respectively. the demodulation signals consist of a sequence of digital samples with a repetition frequency that equals the frequency of the clock signal, and represents sinusoidal osciallations with the frequency of the color sync signal (burst) of the chrominance signal and a mutual phase shift of 90°, so that for example the first demodulation signal represents a sine function and the second demodulation signal a cosine function. In the demodulator 18 each sample value of the digital television signal from the input 17 is multiplied by a sample value of the first and of the second demodulation signal. The results of the products with the clock frequency are delivered as demodulated digital color-difference signals to a first and a second color-difference signal output 21 and 22 respectively. They are fed on the one hand via a color-difference lowpass filter 23 with one channel for each color difference signal for the separation of high-frequency mixing products formed by the demodulator 18 to the output 24 and on the other hand to the signal inputs 26, 27 of the burst controlled phase detector or first phase detector 25. The clock signal is also fed to a clock signal input 28 of the first phase detector 25.

The first phase detector 25 samples the color-difference signals fed to its inputs 26 and 27 during the occurrence of each color sync burst in the color television signal, and thus detects via the first signal input 26 the color sync signal demodulated, i.e. multiplied by the first demodulation signal and at the second signal input 27 the color sync signal demodulated, i.e. multiplied by the second demodulation signal. For example, in the case of a television signal transmitted in accordance with the PAL standard a color sync burst is transmitted following each horizontal sync pulse, and in this time interval the demodulated color sync signals are detected by the first phse detector 25. The first phase detector 25 forms therefrom a color phase signal corresponding to the phase position of the color sync signal of the demodulation signals, and delivers this via a color phase signal 29 to a color phase signal controller 30, which is preferably in the form of a proportional-integral control stage designed as a digital filter, which feeds the color phase signal fed to its input 31, corresponding to its filter characteristic, via an output 32 to a first input 33 of a first adder 34. From the output 35 of the first adder 34 the color phase signal is fed as an increment to an increment input 36 of a first phase calculator 37, a clock signal being fed to its clock input 38. The first phase calculator 37 feeds to a control signal output 39 a first control signal from a sequence of values having a repetition frequency corresponding to the frequency of the clock signal and having a difference between consecutive values determined by the increment fed to the increment input 36.

The first control signal is fed to the input 40 of a demodulator signal generator 41. Every possible value of the first control signal selects a value of the first and of the second demodulation signal in the signal generator 41 and delivers this via its first and second demodulation signal output 42 and 43, respectively, to the first and second demodulation signal inputs 19 and 20, respectively, of the demodulator 18. The signal generator 41 preferentially comprises a read-only memory in which the values of the first and of the second demodulation signal are stored, which are addressed by the values of the first control signal at the input 40. The demodulator 18, the first phase detector 25, the color phase signal controller 30, the first adder 34 and the digital oscillator formed by a combination of the first phase calculator 37 and the signal generator 41, together constitute a digital phase-locked loop, whose signal frequency—the frequency of the demodulation signals—is determined by the increment at the increment input 36.

The circuit arrangement in FIG. 1 further comprises a reference signal source 45 driven by a quartz oscillator 44, which is supplied with the clock signal from the clock signal input 15 and which delivers to an output 46 a reference signal of rectangular wave form and having a frequency that is at least almost equal to the frequency fo the frequency of the color sync burst in the television signal. This rectangular signal consists of a sequence of clock frequency pulses having preferably two different signal values, which follow each other in such a way that a signal of the desired frequency is obtained. To this end, for example, an analog signal is obtained from the quartz oscillator 44 having a rectangular wave form and the frequency of the rectangular signal and whose value is sampled by the clock signal. The recentgular signal can be represented by 1 bit.

Also provided is a second phase calculator 47 which corresponds in structure and mode of operation with the first phase calculator 37. It thus has an increment input 48, a clock input 49 and a control signal output 50. The second phase calculator 47 delivers a second control signal to its control signal output 50, which is fed to a control signal input 51 of a second phase detector 52. The reference signal from the output 46 of the reference signal source 45 is fed to a reference signal input 53 of the second phase detector 52 and is compared in frequency and phase with the second control signal. For this purpose the differences are formed from the values of the reference signal and the corresponding values of the second control signal, which are a measure of the frequency and phase deviations, respectively, and a reference phase signal formed therefrom is delivered to an output 54 of the second phase detector 52 and fed via a reference phase signal controller 55 on the one hand as an increment to the increment input 48 of the second phase calculator 47 and on the other hand to a second input 56 of the first adder 34. The reference phase signal controller 55 is advantageously implemented in the same way as the color phase signal controller 30 as a proportional-integral controller. The increment it delivers to the increment input 48 of the second phase calculator 47 is additively superimposed in the first adder 34 on the color phase signal and is fed together with this as an increment to the first phase calculator 37. The increment from the second phase detector 52 and from the reference phase signal controller 55 varies in inverse proportion to the variations of the clock signal frequency. On the assumption that the color phase signal from the color phase signal controller 30 makes no contribution to the first input 33 of the first adder 34, this proportion of the increment at the increment input 36 of the first phase network 37 gives rise together with the clock signal applied to the clock input 38 of the first phase network 37 to a first control signal at the control signal output 39 of the first phase network 37, which control signal immediately follows the reference signal from the output 46 of the reference signal source 45. Through the color phase signal the increment at the input 36 receives a proportion that corresponds essentially to the deviation of the frequencies or phases of the reference signal and of the color sync burst in the television signal.

The color phase signal controller 30 should preferably have a lowpass characteristic with a very low frequency cut-off, giving the corresponding phase-locked loop a very high frequency stability, in other words so that variations in the frequency of the color sync burst are only very slowly followed. On the other hand the reference phase signal controller 55 permits fast frequency or phase variations in the phase-locked loop in which it is comprised. This phase-locked loop is thus able to compensate for fast fluctuations in the frequency or phase of the clock signal, for example upon a change in the playback head in the case of a video signal from a video recorder. Such changes of playback head take place as a rule at the transition between two consecutive television frames. The circuit arrangement described removes disturbances caused by such head changes before the occurrence of the first scanning line in the television signal on a display screen.

The clock signal is fed not only the analog/digital converter 1, to the first phase detector 25 and to the phase calculators 37, 47 but also the filter stage 6, to the sync separation stage 10, to the color-difference lowpass filter 23, to the color phase signal controller 30, to the second phase detector 52 and to the reference phase signal controller 55 for syncrhonizing their operations.

The outputs 7 for the digital luminance signal, 11 for the vertical sync pulses, 16 for the line sync pulses and 24 for the color-difference signals in the circuit arrangement according to FIG. 1 are connected, for example, to a television display device not shown here.

Figure 2:
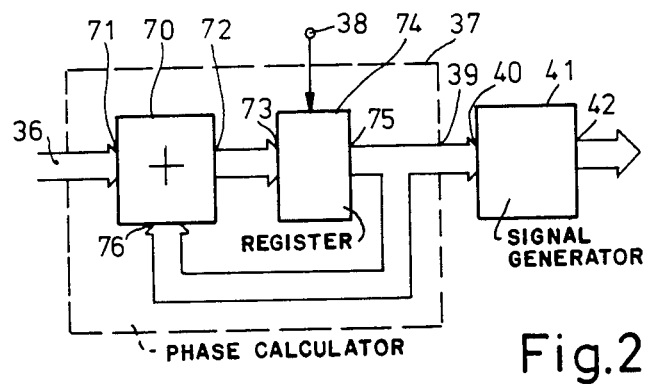
FIG. 2 shows a somewhat more detailed block diagram of an example of a phase calculator from the circuit arrangement in FIG. 1.

FIG. 2 shows a somewhat more detailed circuit diagram giving the structure of a phase calculator as used in the circuit arrangement in FIG. 1, based on the example of the first phase calculator 37. The increment is fed from the increment input 36 of a first input 71 to a modulo-adder 70, whose output 72 is connected to an input 73 of a register 74, whose output 75, which supplies the first control signal, is connected to the control signal output 39 of the first phase calculator 37 and to a second input 76 of the modulo-adder 70. Also fed to the register 74 is the clock signal from the clock input 38, in such a way that in each period of the clock signal the signal fed from the output 72 of the modulo-adder 70 to the input 73 is stored in the register 74 and is available at its output 75. Thus, in each period of the clock signal the value stored in the register 74 is added in the modulo-adder 70 to the increment from the first input 71, that is to say accumulation takes place of the increments supplied via the increment input 36 at the frequency of the clock signal and beginning for example with the value zero. Upon overflow in the modulo-adder 70, i.e. when the sum of the values at the input 71 and 76 exceed the largest displayable value at the output 72, there appears only the difference between this sum value and the largest displayable value. The phase calculator 37 then begins once again to accumulate the increments at the increment input 36.

As already shown in FIG. 1, the first phase network 37 is connected after the control signal output 39 of the signal generator 31 which, together with the phase calculator 37, forms a digital oscillator.

Figure 3:
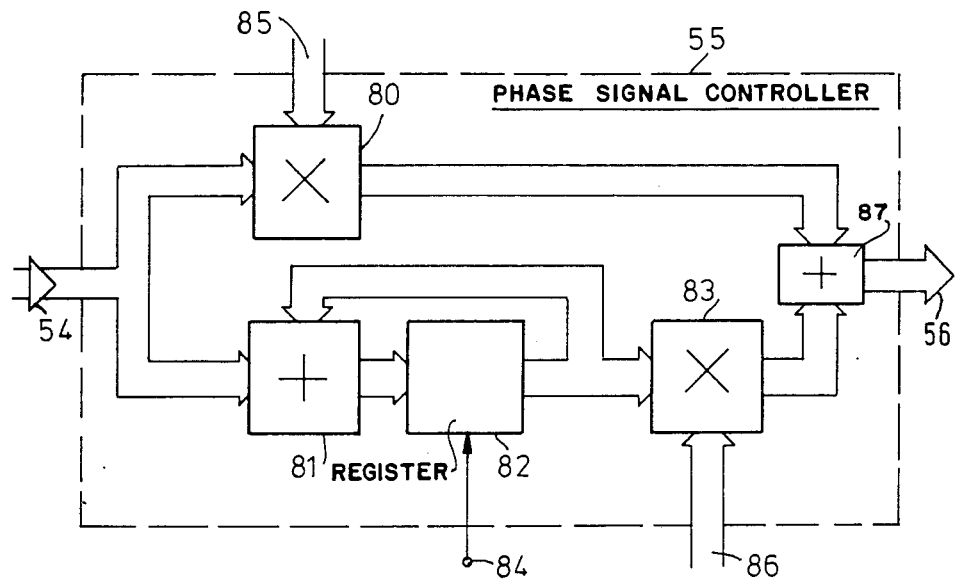
FIG. 3 shows a somewhat more detailed block diagram of an embodiment for a proportional-integral controller in the circuit arrangement in FIG. 1.

FIG. 3 shows an example of an embodiment of the reference phase signal controller 55 as a proportional-integral controller, which contains a proportional branch with a first multiplier 80 and parallel thereto an integral branch with an accumulator device comprising an adder 81 and a register 82, together with a multiplier 83 circuited after this accumulator device. A clock signal is fed to a clock input 84 of the register 82. The multipliers 80, 83 each have an input 85, 86, to which are applied via the reference phase signal controller 55 proportionality factors for adjusting the characteristic, i.e. for adjusting the loop gain and the time constants and hence the control speed. These proportionality factors can be present but can also be variable. Via a further adder 87 the signals from the proportional branch and the integral branch are summed.

Figure 4:
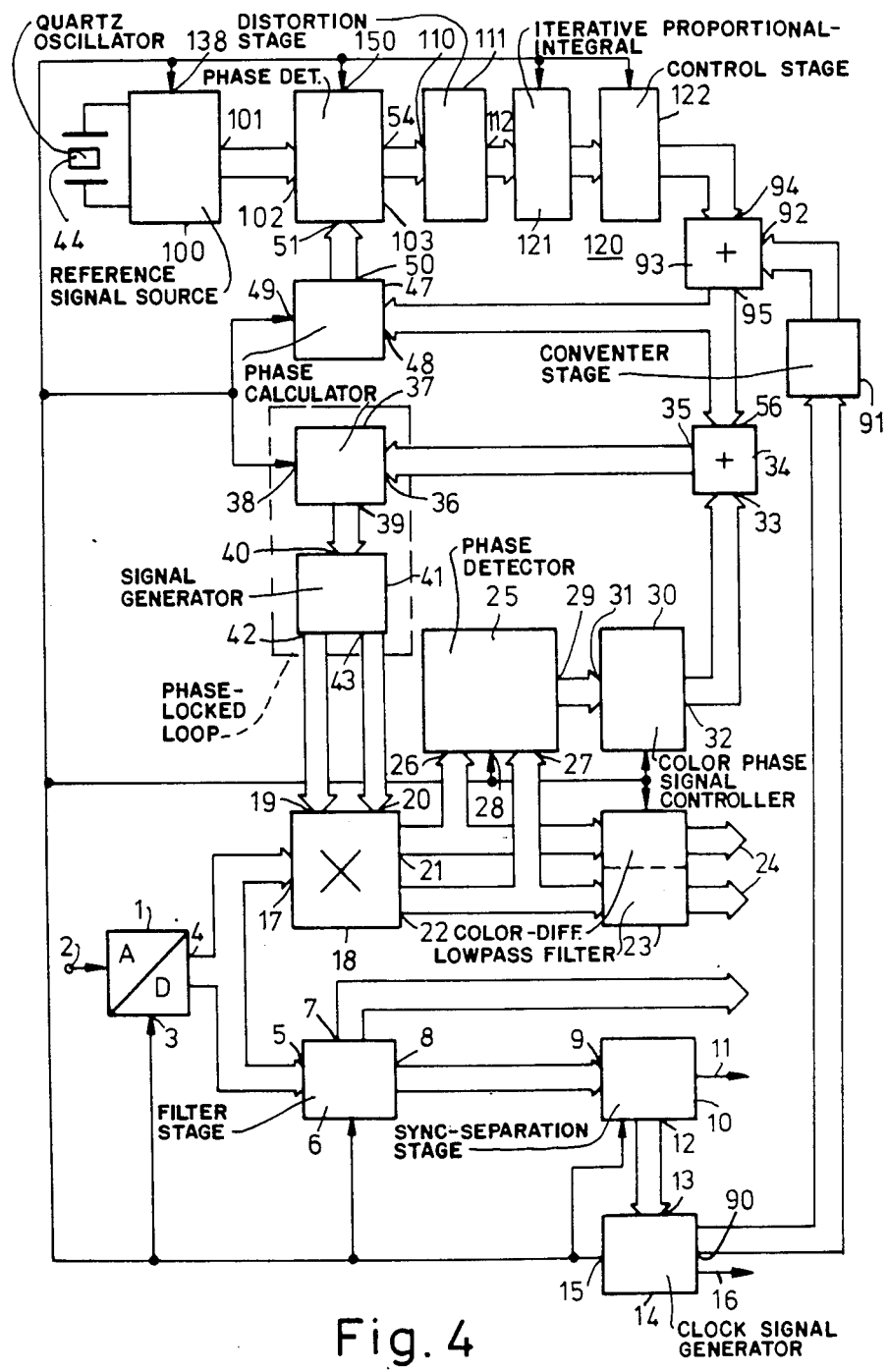
FIG. 4 shows a block diagram of a further embodiment.

FIG. 4 shows a further embodiment of a circuit arrangement according to the invention, being a modification of the arrangement shown in FIG. 1, whereby parts that are identical with this arrangement are indicated by the same symbols as used in FIG. 1.

Figure 9:
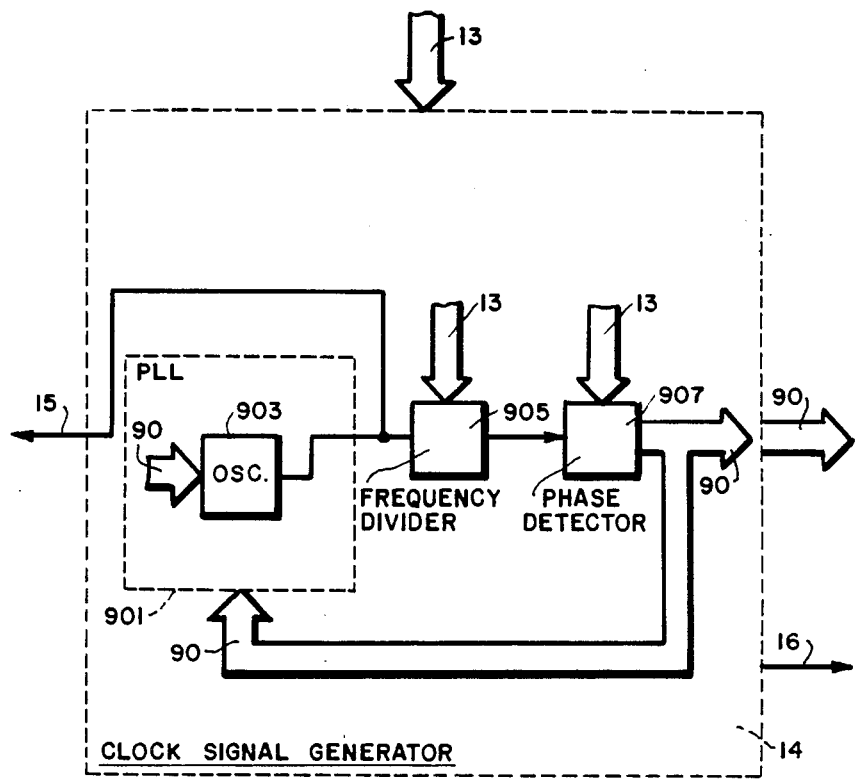
FIG. 9 shows a somewhat more detailed block diagram of an example of a clock signal generator from the circuit arrangement in FIG. 4.

In the circuit arrangement in FIG. 4 a frequency control signal is derived from the clock signal generator 14 via a further output 90 and fed via a converter stage 91 to the first input 92 of a second adder 93. The clock signal generator 14 comprises for example as shown in FIG. 9, a clock signal phase-locked loop 901 with a clock oscillator 903 that delivers the clock signal, a frequency divider 905 which divides the frequency of the clock signal to the frequency of a line sync signal 13 contained in the television signal, and a phase detector 907 which compares the frequency divided clock signal with the line sync signal 13 with respect to frequency and phase, which detector 907 forms the frequency signal 90 which is used to drive the clock oscillator 903. The frequency control signal contains direct information on the frequency of the clock signal.

The second adder 93 is included in the signal path for the reference phase signal in such a way that the reference phase signal is fed to its second input 94 and from its output 95 the sum of the reference phase signal and the frequency control signal is fed to the increment input 48 of the second phase calculator 47 and to the second input 56 of the first adder 34. The converter stage 91 thereby converts for example the value of the frequency control signal in such a way as to adapt it to the values of the reference phase signal and the colour phase signal. Furthermore the converter stage 91 can also dynamically adapt the signal that determines the frequency of the clock signal, for example by means of lowpass filtering or by means of a delay. In this way the coarse regulation which this signal performs on fluctuations of the clock signal can be adjusted within wide limits. For example, it can be used to modify the signal transmission characteristics in the clock signal generator 14 between the sync input 13 and the clock signal output 15.

In a further variant of the circuit arrangement in FIG. 1 the circuit arrangement in FIG. 4 is given a reference signal source 100 which delivers to an output 101 a digital signal which varies periodically with the frequency of the reference signal. This is fed, for example in the form of a binary word of several bits, to a reference signal input 102 of a second phase detector 103, which differs from the second phase detector 52 of the circuit arrangement in FIG. 1 in that it compares two signals representing the binary numbers of several bits, whereas the second phase detector 52 in the circuit arrangement in FIG. 1 detects the value of the discrete-amplitude second control signal at the instant of detecting an edge of the rectangular reference signal. The discrete-amplitude reference signal delivered by the reference signal source 100 thus exhibits a higher resolution than the rectangular reference signal delivered by the reference signal source 45. This increases the accuracy of the second phase detector 103 compared with the version of the second phase detector 52 in the circuit arrangement according to FIG. 1. It thus makes it possible to increase the control speed of the phase-locked loop comprising the second phase detector and the second phase calculator 47.

Figure 5:
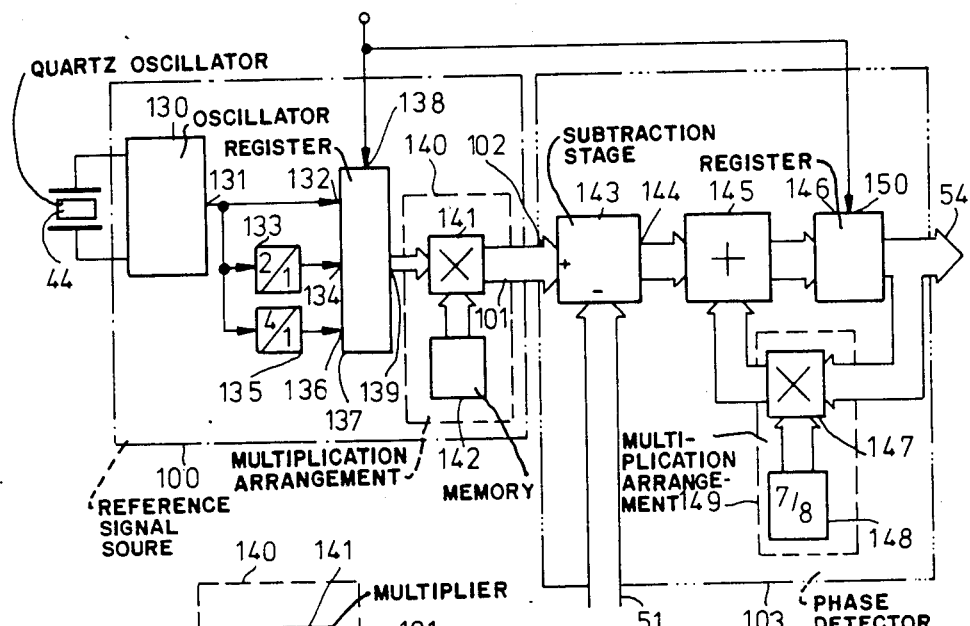
FIG. 5 shows a somewhat more detailed block diagram of examples of a reference signal source and of a second phase detector from the circuit arrangement in FIG. 4.

A higher resolution of the reference signal can for example be obtained by feeding to the second phase detector 103 the oscillation derived from the quartz oscillator 44 via an analog/digital converter with a high sampling rate compared with the frequency of the reference signal. Another implementation with less outlay on circuitry is shown in FIG. 5. An oscillator 130 driven by the quartz oscillator 44 oscillates at a frequency that corresponds at least approximately to four times the frequency of the color synchronization signal. A signal with this frequency is delivered to the output 131 of the oscillator 130 and fed on the one hand directly first input 132 and also via a first divider 133 to a second input 134 and via a second divider 135 to a third input 136 of a 3-part register 137. The signal delivered to the output 131 is preferentially rectangular, and each of the three parts of the register 137 allocated to the inputs 132, 134, 136 stores 1 bit. Also fed to the 3-part register 137 is the clock signal, which goes to a clock input 138. In each period of the clock signal an instantaneous value of the signals at the inputs 132, 134 and 136 is stored in the 3-part register 137 and delivered to its output 139 in the form of a binary word of three bits, This is multiplied in a multiplier 140 by a preset factor and then fed via the output 101 of the reference signal source 100 to the reference signal input 102 of the second phase detector 103.

The multiplication arrangement 140 comprises for example a multiplier 141, to which is fed in addition to the signal from the output 139 of the 3-part register 137 from a memory 142 a constant multiplication factor and which multiplies both together.

Figure 6:
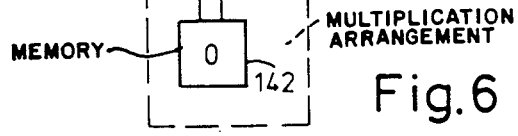
FIG. 6 shows a modification of the circuit arrangement of FIG. 5.

A particularly simple implementation of the multiplication arrangement 140 is obtained when the multiplication factor is an integral power of the decimal number 2. Multiplication by such a factor simply means shifting the bits of a binary number by a number corresponding to the exponent of the power of 2. The multiple 141 then consists simply of an addition of a corresponding number of conductors for the required number of places, while the memory 142 is simplified for example in mass potential at the junction of these conductors. A multiplication arrangement 140 of this type is shown in FIG. 6.

The second phase detector 103 according to FIG. 5 comprises a subtraction stage 143, which on the one hand is fed with the reference signal from the reference signal input 102 and on the other with the second control signal from the control signal input 51, and which performs a modulo-subtraction, that is to say a subtraction without taking account of any carry-over. If for example the multiplication factor of the multiplier arrangement 140 is fixed at the value 32, the reference signal at the reference signal input 102 has the form of an 8-bit binary number. In that case the second control signal is also fed in the form of an 8-bit binary number, and the difference is likewise delivered by the subtraction stage 143 to its output 144 in the form of an 8-bit binary number. The subtraction stage 143 then performs a modulo ($\pm 128$) subtraction.

The signal delivered from the output 144 of the subtraction stage 143 is fed via a recursive filter, consisting of an adder 145, a register 146 and a multiplier arrangement 149 consisting of a multiplier 147 and a memory 148, to the output 54 of the second phase detector 103. The register 146 is driven by the clock signal fed via a clock input 150. In the present example the signal from the output of the register 146 is multiplied in the multiplication arrangement 149 by the factor 7/8. The recursive filter 145 to 149 serves for reducing quantization noise, i.e. for increasing the resolution or reducing the discontinuities between consecutive values in the processed signals. For this purpose the bandwidth of the recursive filter 145 to 149 must be large enough to ensure that it does not significantly affect the control speed of the phase-locked loop containing the second phase detector 103.

From the output 54 of the second phase detector 103 the reference phase signal in the circuit arrangement in accordance with FIG. 4 is fed to an input 110 of a distortion stage 111. The distortion stage 111 comprises for example a read-only memory with individual memory locations which store values of a signal, to be delivered to the output 112 of the distortion stage 111, which are distorted compared with the reference phase signal fed to the input 110. The individual memory locations are addressed by the values of the signal at the input 110, and the value of the addressed memory location is fed to the output 112. This makes possible any desired, for example quadratic, arrangement between the values at the input 110 and the values at the output 112.

Figure 7:
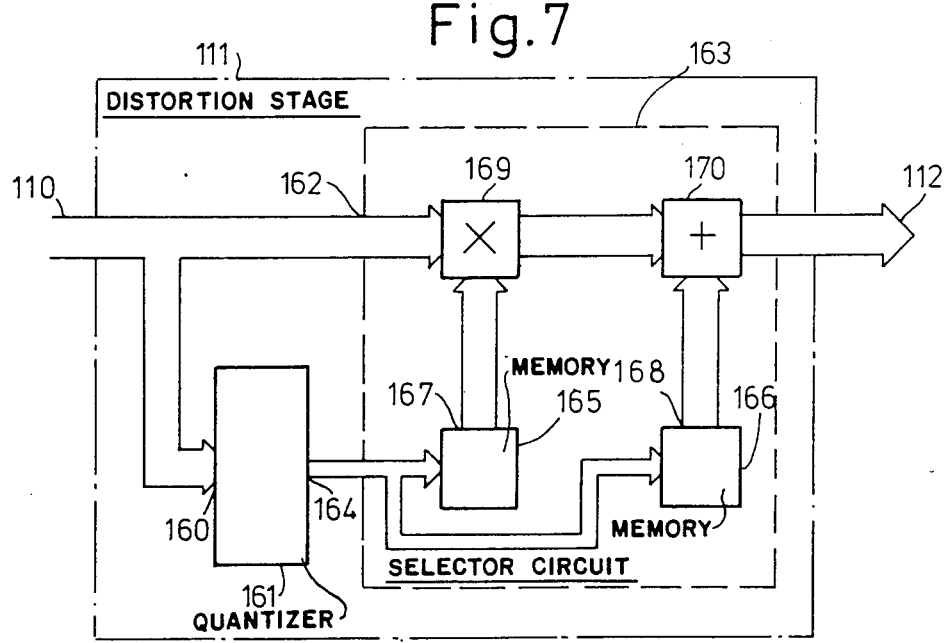
FIG. 7 shows a somewhat more detailed block diagram of a distortion stage from the circuit arrangement in FIG. 4.

A further example of an embodiment of a distortion stage 111 is shown in FIG. 7. In this arrangement the reference phase signal from the input 110 is fed on the one hand to an input 160 of a quantizing stage 161 and on the other to a reference phase signal input 162 of a selector circuit 163. In the quantizer 161 the reference phase signal is compared with a number of treshold values, by means of which the whole range of possible values for the reference phase signal is divided into a corresponding number of subranges. The quantizer 161 delivers to an output 164 a signal that indicates the range of values which comprises the value of the reference signal that has just been applied to the input 110 of the distortion stage 111. This signal from the output 164 of the quantizer 161 drives two memories 165 and 166 in the selector circuit 163 in such a way that each deliver a signal value at the outputs 167 and 168 respectively. The selector circuit 163 further comprises a multiplier 169 and an adder 170. The multiplier 169 multiplies the reference phase signal which it receives from the reference phase signal input 162 of the selector circuit 163 by the signal value fed to it from the output 167 of the first memory stage 165, which signal value thus determines the rise of the curve which represents the allocation between the values of the reference phase signal at the input 110 and that at the output 112 of the distortion stage 111 in the relevant range of values. The signal generated by the multiplier 169, being the product of the reference phase signal from the input 110 and the signal value from the first memory stage 165, is added in the subsequent adder 170 to the signal value from the second memory stage 166 and fed as an allocated value of the reference phase signal to the output 112 of the distortion stage 111. With the distortion stage 111 described it is thus possible to make an allocation between the values at the input 111 and at the output 112 in accordance with a continuous curve with linear ranges of values. It is of course also possible with such an arrangement to obtain non-continuous characteristics.

With a distortion stage 111 of the kind described here by way of example a progressive characteristic is preferentially adjusted between the values of the reference signal at the input 110 and the output 112, since the case of low values for the reference phase signal this will give a low loop gain and hence a narrow bandwidth, and in the case of higher values for the reference phase signal it will give a high loop gain. In the case of small phase deviations it is thus possible to achieve a more exact correction of phase errors with a lower control speed, and with large phase errors a fast, approximate correction can be achieved with a high control speed.

The three arrangements for increasing the control speed, described with reference to FIG. 4, firstly by supplying a signal that reveals the frequency of the clock signal via the second adder 93, secondly the reference signal source 100 that supplied a discrete-amplitude reference signal, and thirdly the distortion stage 111, can be implemented independently of one another, and not only jointly as represented in FIG. 4, in the circuit arrangment as envisaged in FIG. 1.

The circuit arrangement in FIG. 4 further shows a 2-stage reference phase signal controller 120 which consists of a first and a second iterative proportional-integral control stage 121, 122. Each of the stages 121, 122, which can also be implemented independently of one another, may be designed as shown by way of example in FIG. 3.

Figure 8:
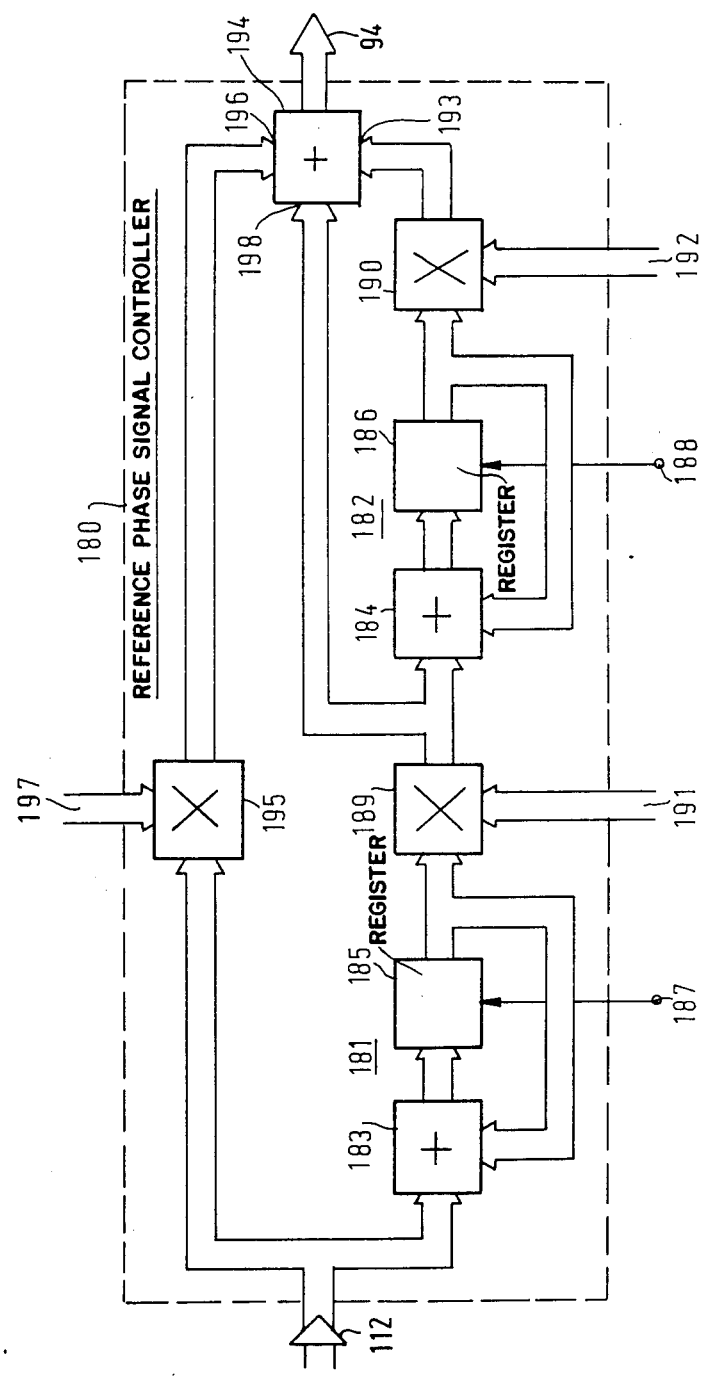
FIG. 8 shows an alternate embodiment for a reference phase signal controller in the circuit arrangement of FIG. 4.

Instead of the 2-stage reference phase signal controller 120 in FIG. 4, use can be made advantageously of a reference phase signal controller 180 as shown in FIG. 8. It comprises two integrators 181, 182 which consist in accordance with the prior art of an adder 103, 104 and a register 105, 106, respectively, in the manner of accumulation devices. The clock signal is accordingly fed to a clock input 187 and 188 respectively of a register 185 and 186 respectively. The integrators 181, 182 are each connected at their outputs with a multiplier 189, 190, in which each output signal of the integrators 181, 182 is multiplied by one of the proportionality factors applied via an input 191, 192 of the multipliers 189, 190.

The reference phase signal fed from the output 112 of the distortion stage 111 is now applied to a first input 193 of an output adder 194 consecutively via the first integrator 181, the first multiplier 189, the second integrator 182 and the second multiplier 190, and also via a third multiplier 195 to a second input 196 of the output adder 194. Via an input 197 the third multiplier 195 is supplied with a further proportionality factor by which the signal from the output 112 of the distortion stage 111 is multiplied before it is applied to the second input 196 of the output adder 194. Furthermore, the output adder 194 receives at the third input 198 the signal from the output of the first multiplier 189. The sum of the signals from the inputs 193, 196, 198 of the output adder 194 is fed to the second input 94 of the second adder 93.

We claim:

1. Circuit arrangement for deriving digital-color signals from an analog television signal with
   an analog/digital converter which forms from the analog television signal a digital television signal which comprises a sequence of discrete-amplitude samples of the analog television signal having a repetition frequency determined by a clock signal supplied by a clock signal generator, which corresponds to a whole multiple of the line frequency of the television signal,
   a demodulator which forms the digital color signals by multiplication of the digital television signal by at least a digital demodulation signal,
   a first phase detector which derives from certain digital color signals from the output of said demodulator, a color phase signal which is a measure of the phase positions of the digital color signals relative to one another and/or to the demodulation signals,
   a first phase calculator that delivers a first control signal which consists of a sequence of values having a repetition frequency determined by a clock signal and whereby the difference between every two successive values is adjusted by the color phase signal,
   a demodulator signal generator coupled at its input to the output of said first phase calculator for applying demodulation signals to said demodulator,
   a reference circuit which comprises a reference signal source, a second phase detector that generates a reference phase signal, and a second phase calculator that delivers a second control signal to said second phase detector consisting of a sequence of signal values, whereby the difference between every two consecutive signal values is adjusted by the reference phase signal, and which supplies the reference phase signal to the first phase calculator for supplementary adjustment of the difference between two consecutive values of the first control signal, characterized in that the sequence of the values of the second control signal from the second phase calculator consists of a sequence whose frequency is determined by the clock signal, and in that the second phase detector compares the second control signal with the reference signal generated by the reference signal source and forms therefrom the reference phase signal.

2. Circuit arrangement as claimed in claim 1, characterized in that the reference phase signal is additively superimposed on the color phase signal before going to the first phase calculator.

3. Circuit arrangement as claimed in claim 1, characterized in that the clock signal is derived from a clock oscillator in a clock signal phase control circuit whose oscillation frequency is determined by a frequency controlled signal obtained from the comparison of a line synchronization signal contained in the analog television signal with the frequency-divided clock signal, characterized in that the frequency control signal is additively superimposed on the reference phase signal fed to at least the first phase calculator.

4. Circuit arrangement as claimed in claim 1, characterized in that the reference phase signal is fed to the first and the second phase calculators via a reference phase signal controller.

5. Circuit arrangement as claimed in claim 4, characterized in that the reference phase signal controller comprises a proportionalintegral control stage.

6. Circuit arrangement as claimed in claim 4, characterized in that the reference phase signal controller contains a chain network of at least two integrators with which at least a proportional branch is connected in parallel.

7. Circuit arrangement as cliamed in claims 4, 5 or 6, characterized in that the reference signal is fed to an input of a distortion stage whose output signal is fed to the reference phase signal controller and in that the distortion stage so distorts the reference phase signal that large values of the reference phase signal are increased in accordance with a nonlinear arrangement between values at the input and output more than proportionally compared with small values.

8. Circuit arrangement as claimed in claim 7, characterized in that the distortion stage contains a storage device which for every value of the reference phase signal at the input forms a value at the output of the distortion stage and feeds this to the reference phase signal controller.

9. Circuit arrangement as claimed in claim 7, characterized in that the distortion stage comprises a quantizer (161) which compares the values of the reference phase signal with one or more threshold values, and a selector circuit controlled by the quant6izer (161) which converts values of the reference phase signal, individually limited by the treshold value or values in accordance with a linear arrangement and which are fed to its input, into values which are fed from the output of the distortion stage to the reference phase signal controller.

10. Circuit arrangement as claimed in one or more of claims 3 to 6, characterized in that the reference signal source delivers a square-wave signal which is sampled with a register controlled by the clock signal.

11. Circuit arrangement as claimed in one or more of the claims 1 to 6 or 8-9, characterized in that the reference signal source comprises an oscillator which delivers an oscillation with a frequency that corresponds to a whole multiple of the frequency of the reference signal, and a converter which converts the oscillation of the oscillator into a periodic signal of discrete amplitude and having the frequency of the reference signal.

12. Circuit arrangement as claimed in one or more of the claims 1-6 or 8-9, characterized in that the frequency of the reference signal is at least almost equal to the frequency of the color synchronization signal of the television signal.

* * * * *

UNITED STATES PATENT AND TRADEMARK OFFICE
CERTIFICATE OF CORRECTION

PATENT NO. : 4,689,664
DATED : August 25, 1987
INVENTOR(S) : Wilhelm Moring et al It is certified that error appears in the above-identified patent and that said Letters Patent is hereby corrected as shown below:

<u>IN THE CLAIMS</u>

| | | |
|---|---|---|
| Claim 9, | line 3 | delete "(161)" |
| | line 5 | change "quant6izer" to --quantizer--; delete "(161)" |
| Claim 11, | line 2 | delete "the" first instance |
| | | delete "or 8-9" |
| Claim 12, | line 2 | delete "the" first instance |
| | | delete "or 8-9" |

Signed and Sealed this

Twenty-second Day of November, 1988

Attest:

DONALD J. QUIGG

*Attesting Officer*   *Commissioner of Patents and Trademarks*